United States Patent [19]

Battard et al.

[11] 4,187,119
[45] Feb. 5, 1980

[54] GLUE FOR ARTICLES IN THE TOBACCO INDUSTRY

[75] Inventors: Jean-Claude Battard, Saran; Jean Buisson, Orleans, both of France

[73] Assignee: Service d'Exploitation Industrielle des Tabacs et des Allumettes, Paris, France

[21] Appl. No.: 872,471

[22] Filed: Jan. 26, 1978

Related U.S. Application Data

[63] Continuation of Ser. No. 685,750, May 13, 1976, abandoned.

[51] Int. Cl.² .............................................. C09H 11/00
[52] U.S. Cl. ................................. 106/126; 106/128; 106/129; 106/136
[58] Field of Search ................ 106/126, 129, 136, 128

[56] References Cited

U.S. PATENT DOCUMENTS 2,824,092  2/1958  Thompson .......................... 106/128
3,398,007  8/1968  Pillersdorf et al. .................. 106/136
3,758,323  9/1973  Szymanski et al. .................. 106/130

Primary Examiner—Theodore Morris
Attorney, Agent, or Firm—Holman & Stern

[57] ABSTRACT

Glue for articles of the tobacco industry such as cigarettes, cigarillos, cigars, filter tips, coupling-sleeves, etc., characterized by the fact that at ambient temperature it is in gel form composed mainly of water and gelatine, the gelatine concentration being in the 25–180% range in relation to the water weight, and a minor quantity of plasticizer for the gelatine in aqueous solution, belonging to the food polymers group comprising natural and modified vegetable gums and cellulose ethers, the plasticizer's concentration being within the 0.25–8% range in relation to the weight of the gelatine alone, and being adjusted so that the temperature at which the liquefied gel viscosity remains superior to 50 centipoises and becomes lower than 1000 centipoises is within the 40–70° C. range.

9 Claims, No Drawings

GLUE FOR ARTICLES IN THE TOBACCO INDUSTRY

This is a continuation of application Ser. No. 685,750, filed May 13, 1976 which in turn is abandon.

The present invention relates to improvements in the production of continuous tobacco twists provided with a wrapping of tape material for the making of cigarettes, cigars, filter tips and similar. The invention relates more particularly to the gluing of said wrapping on the very high speed machines and/or in other difficult cases where for instance the tape material offers poor gluing qualities.

For gluing cigarettes (when making continuous tobacco twists, this operation consists in applying a line of glue on the edge of the paper before folding said edge and driving the twist at right angles through a device for setting the glue) it was possible so far to simply use "cold" glues and more particularly amylaceous glues in aqueous solution. Slightly modified starch and fecula pastes are prepared from dry powders simply dissolved in water (hot, tepid, or even cold according to the exact composition). Such preparations offer furthermore the advantages of being relatively cheap and above all of presenting no risks for the smoker's health, before or after pyrolysis, being based on foodstuffs and having been used constantly for many years. Moreover the most employed gels liquefy by simply stirring and/or by applying pressure and their use necessitates no complicated apparatus.

Such glues however offer disadvantages which will from now limitate their use to the less developped fabrications, these disadvantages being due for most of them to their high water content: on the one hand they dry very quickly in ambient atmosphere and this entails the necessity of frequent cleanings: discs and other gluing machine parts as such when stopped however shortly, tanks and pipings for more prolonged stops. On the other hand their gluing capacity remains low and this made them difficult to use with wrapping materials usually less porous than ordinary wove paper: coloured and/or waterproof paper, or too rugged and/or dusty such as restored tobacco. Finally, and this is the main criticism which can be passed on this type of products, they necessitate a drying period incompatible with the present production rates. If some years ago these rates hardly reached 2000 cigarettes a minute (corresponding to a tobacco twist speed of the order of 140 meters/minute), more than 4000 cigarettes are now produced in the same period of time and the twist speed exceeds 280 m/mn. Under these conditions, it is to be conceived that even by making the gluing chambers longer and by increasing the thermal capacity of the heating parts, the contact time available for drying the seam of the maintained twist is much reduced, especially when one wishes to avoid a too cumbersome machine and the risk of yellowing the paper.

For the fabrication of filter tips (where the tobacco twist speed can reach 400 m/mn when a simple cellulose acetate wick is involved), the snag can be avoided by using "hot" glues or by reactivating solid glues, such process being called in the art the "hot-melt" process. The glue becomes "solid" again (or ultra-viscous) by simply cooling down and this allows it to go on setting when the filter tips have left the machine. Commercial glues used in filter tips are for the most part unusable in the making of cigarettes for the following reasons: on the first hand they are synthetic resin based and the pyrolysis products of these high polymers are a priori suspect as regards the smoker's health; furthermore as they are reactivatable when subjected to a high temperature, it is to be feared that cigarettes glued in this manner (and this proves right from experience) have seams which slide and even open in the proximity of embers. The compression rate of tobacco and its resilient reaction are higher than those of the filtering materials and a sliding of the seam which creates an inopportune change in the diameter could already occur before completely cooling down when leaving the machine.

It is a primary object of the present invention to provide glues for cigarettes and other articles of the tobacco industry offering none of the above mentioned disadvantages. A further object is to provide the user with glues for economical cigarettes, compatible with a use considered as fit for "food products", offering the advantages of hot glues (lengthy shelf life when prepared, no running during machine stops, cleaning of the gluing machine parts at wide intervals and even useless, improvement of the adherence strength after making the articles) as well as those of cold amylaceous glues: ease in preparation and use, relatively low temperature for use (no risks of burns, reduced power consumption), ease in cleaning dirty machine parts (such as the gluing chamber) owing to their solubility in hot water, absence of the smell associated to pyrolysis, etc.

The present invention relates primarily to a glue for articles of the tobacco industry such as cigarettes, cigarillos, cigars, filter tips, coupling-sleeves, characterized by the fact that at ambient temperature it is in gel form constituted mainly of water and gelatine, the gelatine concentration being in the range of 25 to 180 weight percent, basis being water, and a minor quantity of plasticizer for the gelatine in aqueous solution, belonging to the food polymers group comprising natural and modified vegetable gums and cellulose ethers, the concentration of plasticizer being in the range of 0,25 to 8 weight percent, basis being gelatine alone, and being adjusted so that the temperature at which the liquefied gel viscosity remains higher than 50 centipoises and becomes lower than 1000 centipoises is within the 40°–70° C. range.

The term "food polymers" means substances meeting the rules laid down and applying to foodstuffs in the country involved as gelatinizing agent, thickener, stabilizing agent or emulsifier. Thus, and as regards the European Economic Community (EEC), the following substances E 401 to E 408 included, E 410 to E 414 included, E 440 and E 461 to E 466 included are comprised in the group, as well as thoses which will eventually appear in the future in the Table and its Supplements.

In the preferred embodiments of the invention, in order not to have too much water to eliminate during solvent synaeresis, the gelatine concentration is within 30 and 50 weight percent, basis water. The plasticizer's concentration can be within 0.5 and 4 weight percent, basis the gelatine alone, and adjusted so that the temperature of use for which the viscosity of the liquefied gel remains above 70 centipoises and comes below 850 centipoises be comprised between 45° and 65° C.

According to one of the embodiments of the invention, the preferred plasticizer (due to its large viscosity range) is sodium alginate used in a concentration of the order of 1% compared to the gelatine weight. In another embodiment, the plasticizer can be carragenate of same concentration. Other natural gums such as guarana gum and gum-arabic and pectines can also be convenient in various concentrations.

To plasticizer can also be a vegetable origin gum or a biological origin gum with several transformations. Amongst the preferred plasticizers of such type are mainly the polysaccharides and, to a lesser degree, more or less modified starches as well as galactomannanes.

Finally the plasticizer can be a cellulose ether. In this category, preference should be given to carboxymethylcellulose, used as usual in salt form (sodium salt).

For all above plasticizers, the ponderal concentration calculated in relation to the weight of the gelatine alone can be very low, of the order of a few units per hundred for instance. The exact concentration however should be determined for each product type used so as to adjust at best the glue viscosity in hot condition (where it is in "sol" form and should be fluid enough to run well without being however too liquid in order to control the flow easily) as well as in the cold condition where the gel which it forms (or forms again) should be thick without being too rigid.

From this point of view, the present invention relates also to a process for the preparation of glue for articles of the tobacco industry similar to cigarettes, process comprising dissolving in water maintained between 50° and 70° C. a quantity of gelatine such that the gelatine/water ponderal concentration be comprised between 25 and 60%, determining on samples the stoichiometric proportion of a gelatine plasticizer selected from the group formed by food polymers, comprising natural and modified gums and cellulose ethers allowing to limit the solution viscosity between 60 and 1000 centipoises at said temperature, mixing in the solution the smallest quantity of plasticizer so determined corresponding to the gelatine weight used and cooling the mixture down to ambient temperature.

The glue so prepared can be kept in gel form without particular precaution; it can be easily protected against moisture by adding a very small dose of anti-fungus product such as potassium sorbate. Its use in continuous tobacco twists machines requires only a re-liquefaction before use by increasing the temperature between the limits set hereinabove. A temperature of 55° C. will be particularly suitable for a gelatine concentration equal to 35% of the water weight.

Examples of preparations are now given as illustrations of the possibilities afforded by the invention.

EXAMPLE 1:

In 10 liters of water heated between 50° and 70° C. and maintained at a temperature substantially constant, for instance 60° C., by a malaxating device provided with a thermostatic heating system, there is poured progressively in shower 40 grams of sodium alginate. 18 grams of potassium sorbate have been prior added to the water as anti-fungus substance. When the hydratation of the alginate is completed, 3500 grams of gelatine of food quality are progressively added and bacteriologically controled according to AFNOR n° 1 rule.

The Cg% gelatine ponderal concentration in relation to water (gelatine mass divided by the water mass and multiplied by one hundred) is of the order of 35%. The Cp% APV ponderal concentration in relation to gelatine (plasticizer mass divided by gelatine mass multiplied by one hundred) is of the order of 1,1%.

The hot broth is poured in vessels allowing easy demolding and is cooled down to ambient air. A gel is easily obtained that will keep without particular precautions during several weeks and is easily handled, being neither sticky nor running. It can be cut up in suitably sized parts to fill the (heated) glue tank of any machine of the tobacco industry, without any difficulty. At a temperature of 45° C., the viscosity of the melted glue is of the order of 160 centipoises and, at 65° C. of the order of 60 centipoises. A working temperature of 55° C. has given excellent results for gluing the wrapping sleeve of a filter wick (acetate) at a speed of 400 meters per minute and a glue consumption of the order of 1 gram for 100 meters of tobacco twist.

The seam is dried up by a standard drying iron and cooling down has not offered any particular constraint. The gluing qualities are excellent and if there is a later warming up over 100° C., the seam does not open as this was not the case with glues used so far.

It is to be noted that the glue, instead of being remelted can be used liquid and still hot immediately after being prepared.

EXAMPLE 2

Example 1 is repeated with 10 liters of water but with 5900 grams of gelatine and 2300 grams of an aqueous solution of alginate at 2% containing about 46 grams of APV and 2250 grams of water.

The Cg% ponderal concentration is of the order of 50% and the Cp% plasticizer ponderal concentration is of the order of 0,8%. The mixture viscosity when cooled down at 45° C. is of the order of 790 centipoises. The glue so prepared is suitable for strong gluing operations at working temperatures of use of 70° C., for instance for the filter coupling-sleeves onto the cigarettes.

EXAMPLE 3

Example 1 is repeated with 10 liters of water but with 5000 grams of gelatine and 175 grams of powder sodium alginate meeting the requirements of the Codex. The Cg% concentration of the gelatine is of the order of 50% and the Cp% concentration of the plasticizer of the order of 3,5%. This viscosity at 45° C. is of the order of 250 centipoises. Same use as in examples 1 and 2.

EXAMPLE 4

Example 1 is repeated with 10 liters of water but with 4100 grams of gelatine and 120 grams of carragenate. The Cg% gelatine concentration is of the order of 41% and the Cp% plasticizer concentration is of the order of 2,9%. Viscosity at 45° C. is of the order of 185 centipoises. Same use as in example 1, or gluing cigar tips on restored tobacco outer leaves.

EXAMPLE 5

Example 1 is repeated with 10 liters of water but with 3500 grams of gelatine and 15 grams of guar gum. The Cg% gelatine concentration is of the order of 32,5% and the Cp% plasticizer concentration of the order of 0.45%. Viscosity at 45° C. is about 125 centipoises. This light glue can be used at 55° C. for cigarette papers (at a rate of 2,5 grams of glue for 100 meters of tobacco twist) or as in example 1. Both glues have a similar performance.

EXAMPLE 6

Same procedure as in example 1 with 10 liters of water in which are dissolved 3700 grams of gelatine and 40 grams of gum-arabic.

When the gel is cooled down, the Cg% gelatine ponderal concentration is of about 37% and the Cp% plasticizer concentration (in relation to the gelatine) of about 1,1 (these figures apply also to the examples below).

The gel is re-liquefied at 35° C. in the glue tank of a cigarette machine producing with so-called "maize" wove paper (the most difficult to glue), 310 meters of tobacco twist per minute. With the same use rate as in example 5, the gluing is quite satisfactory although slightly less powerful than in the preceding case.

EXAMPLE 7

Example 6 is taken again but by using instead of gum-arabic an aqueous solution containing 40 grams of acetylated starch. Results are almost equivalent to those of examples 5 and 6.

EXAMPLE 8

Example 6 is taken again but by using instead of gum-arabic an aqueous solution containing 40 grams of sodium carboxymethylcellulose. In the same conditions of use as in example 6, results are excellent and even superior to those obtained with the glue of example 5.

Other plasticizers have also been used with success with Cp% concentrations equivalent to the foregoing (1,1%). Galactomanne methylcellulose, polysaccharides and other biopolymers have been used. The glues so obtained are slightly less easy to use and not as secure as those of examples 5 to 8 but, in certain particular cases, can offer interesting features which lead not to reject them from the field of the invention.

What we claim is:

1. Glue for articles of the tobacco industry such as cigarettes, cigarillos, cigars, filter tips, coupling-sleeves, etc., characterized by the fact that at ambient temperature it is in gel form consisting essentially of water and gelatine, the gelatine concentration being in the 25–180% range in relation to the water weight, and a minor quantity of plasticizer for the gelatine in aqueous solution, selected from the group consisting of sodium alginate, carragenate, guar gum, gum arabic, pectine, galactomanne methylcellulose, sodium carboxymethylcellulose and acetylated starch, the plasticizer's concentration being within the 0,25–8% range in relation to the weight of the gelatine alone, and being adjusted so that the temperature at which the liquefied gel viscosity remains superior to 50 centipoises and becomes lower than 1000 centipoises is within the 40°–70° C. range.

2. Glue according to claim 1, characterized by the fact that the gelatine concentration is within the 30–50% range in relation to the water weight, the plasticizer concentration is within the 0.5–4% range in relation to the weight of the gelatine alone, and is adjusted so that the temperature at which the liquefied gel viscosity remains superior to 70 centipoises and becomes lower than 850 centipoises is within the 45–65 degrees centigrade range.

3. Glue according to claim 2, characterized by the fact that the plasticizer is a water soluble alginate.

4. Glue according to claim 2, characterized by the fact that the plasticizer is a water soluble cellulose ether.

5. Glue according to claim 3, characterized by the fact that the plasticizer is sodium alginate.

6. Glue according to claim 4, characterized by the fact that the plasticizer is carboxymethylcellulose.

7. Glue according to claim 1, characterized by the fact that the plasticizer ponderal concentration in relation to gelatine is of the order of 1%.

8. Glue according to claim 1, characterized by the fact that the gelatine ponderal concentration in relation to the weight of water is of the order of 40%.

9. Process for preparing a glue according to claim 1 characterized by the fact that it comprises dissolving in water maintained between 50° and 70° C. a quantity of gelatine such as the ponderal concentration of the gelatine in relation to water be within the range of 25 and 60%, determining the stoichiometric proportions of the plasticizer on samples in order to limit the solution viscosity at the preparation temperature between 60 and 1000 centipoises, mixing the smallest of the quantities of plasticizer so determined and corresponding to the weight of gelatine used with the solution and cooling the mixture down to ambient temperature.

* * * * *